April 30, 1946.  T. W. HILTON  2,399,227
NUT
Filed Nov. 27, 1943
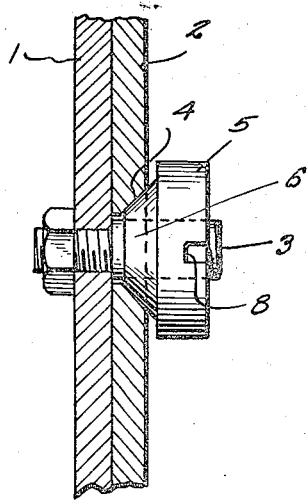
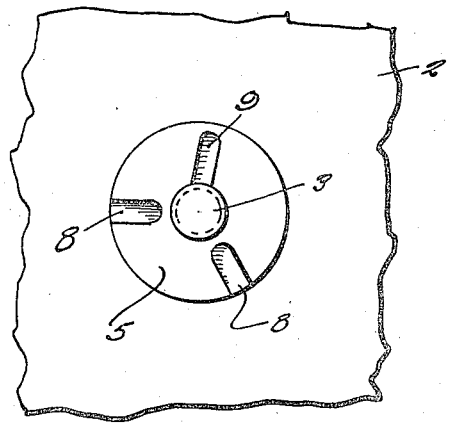
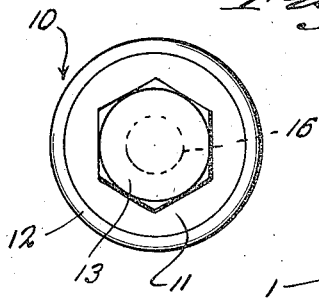
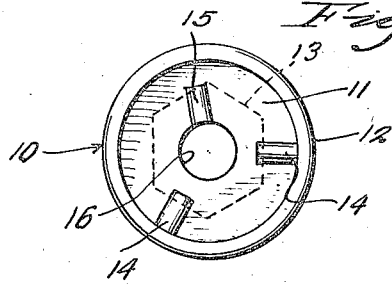
Inventor
TERRANCE W. HILTON Patented Apr. 30, 1946

2,399,227

UNITED STATES PATENT OFFICE 2,399,227

NUT

Terrance W. Hilton, Windsor, Ontario, Canada

Application November 27, 1943, Serial No. 511,970

1 Claim. (Cl. 85—32)

The present invention relates to new and useful improvements in securing nuts, particularly for the wheels of motor vehicles, although it will be understood, of course, that the device may be used for any purpose for which it may be found adapted.

The primary object of the invention is to provide, in a manner as hereinafter set forth, a nut of the character described comprising a novel construction and arrangement, whereby unauthorized removal will be prevented.

Another very important object of the invention is to provide unique means for removing the nut by a person authorized to do so.

Other objects of the invention are to provide a nut of the character set forth which will be comparatively simple in construction, strong, durable, compact, and which may be manufactured at low cost.

All of the foregoing, and still further objects and advantages of the invention will become apparent from a study of the following specification, taken in connection with the accompanying drawing, wherein like characters of reference designate corresponding parts throughout the several views, and wherein:

Figure 1 is a view in vertical section through a portion of a motor vehicle wheel and brake drum, showing a nut constructed in accordance with the present invention in use thereon.

Figure 2 is an elevational view thereof.

Figure 3 is an elevational view of the socket, looking at the outer end thereof.

Figure 4 is an elevational view of the socket, looking at the inner end thereof.

Figure 5 is a vertical sectional view, showing the nut in use and the socket applied thereto.

Referring now to the drawing in detail, it will be seen that reference characters 1 and 2 designate, respectively, portions of a motor vehicle brake drum and a wheel mounted thereon. A stud 3 on the drum 1 projects through the usual, substantially conical opening 4 in the wheel 2.

The embodiment of the present invention which has been illustrated comprises a circular nut 5 of suitable metal and dimensions. The nut 5 is provided with a substantially frusto-conical end portion 6 which is engageable in the opening 4 in the wheel 2. A threaded bore 7 in the nut 5 receives the stud 3.

The nut 6 has formed in its outer end a plurality of radial ways 8. The ways 8 are open at their outer ends and communicate with the periphery of the nut 5. The inner ends of the ways 8 are closed and said inner ends are spaced from the bore 7.

The nut 5 is further provided, in its outer end, with one or more radial ways 9 which are open at their inner ends and communicate with the bore 7. The ways 9 are closed at their outer ends, which outer ends are spaced from the periphery of the nut 5.

A socket 10 of suitable metal is provided for applying and removing the nut 5. The socket 10 includes a disc 11 having fixed thereon and projecting therefrom a ring 12 for the reception of the nut 5. Formed integrally with the disc 11 is a polygonal head 13 for receiving a wrench or other suitable tool.

Radial keys 14 and 15 are formed integrally with the disc 11 in the projecting portion of the ring 12. The keys 14, which extend inwardly from the ring 12, are engageable in the ways 8 of the nut 5. The key 15, which extends outwardly from a socket 16 in the disc 11, is engageable in the way 9 of the nut 5.

It is thought that the manner in which the invention is used will be readily apparent from a consideration of the foregoing. Briefly, the nut 5 is applied to the stud 3 and said nut may be turned hand tight. The socket 10 is then applied to the nut for tightening same through the medium of a wrench engaged with the head 13, after which said socket is removed. When the circular nut 5 is thus tightened, it cannot be removed with a conventional wrench which, of course, cannot obtain a grip on said nut. However, the nut may be readily removed by engaging the socket 10 therewith. The keys 14 engage in the ways 8 and the key 15 engages in the way 9 for operatively connecting the socket 10 to the nut 5, as hereinbefore set forth. The socket 16 accommodates the projecting end portion of the stud 3. Any desired number, combination and arrangement of the ways and keys may be used. The combinations are so numerous that there is small chance of another person obtaining a socket member which will fit a nut which he is not authorized to remove.

It is believed that the many advantages of a nut constructed in accordance with the present invention will be readily understood, and although a preferred embodiment is as illustrated and described, it is to be understood that changes in the details of construction may be resorted to which will fall within the scope of the invention as claimed.

What is claimed is:

In combination, a circular nut having a threaded bore extending longitudinally therethrough and further having a plurality of radial ways in its outer end, certain of the ways being spaced from the bore and communicating with the periphery of the nut, and certain of the ways being spaced from said periphery of the nut and communicating with the bore.

TERRANCE W. HILTON.